United States Patent

Rock

[15] 3,653,015

[45] Mar. 28, 1972

[54] DIGITAL SCALE AND METHOD

[72] Inventor: Frank C. Rock, Santa Rosa, Calif.

[73] Assignee: National Controls, Inc., Santa Rosa, Calif.

[22] Filed: June 1, 1970

[21] Appl. No.: 41,877

[52] U.S. Cl. ..........................340/204, 235/92 WT, 177/25, 235/151.33, 177/2, 177/3, 340/347 PR

[51] Int. Cl. ..........................G08c 19/16

[58] Field of Search ..........................340/204, 190, 266, 347 PR, 340/172.5, 324; 177/2, 3, 25, 210; 235/151.33, 92 WT

[56] References Cited

UNITED STATES PATENTS

| | | | |
|---|---|---|---|
| 3,439,760 | 4/1969 | Allen | 177/25 |
| 3,247,915 | 4/1966 | Chilton | 235/151.33 |
| 3,052,409 | 9/1962 | Williams | 235/92 WT |
| 3,055,585 | 9/1962 | Bell et al. | 235/92 WT |
| 2,975,409 | 3/1961 | Petherick | 340/347 PR |

*Primary Examiner*—John W. Caldwell
*Assistant Examiner*—Robert J. Mooney
*Attorney*—Flehr, Hohbach, Test, Albritton & Herbert

[57] ABSTRACT

Digital display system and method for weighing scales wherein an encoder provides a digital signal indicative of the position of the dial pointer of the scale. The digital signal is converted to binary coded decimal form, multiplied by a scale factor to provide a reading in the desired increments of measure, and displayed by visual display elements such as Nixie tubes. When the scale is operating above its normal range, an overscale signal is produced which causes an overscale digit to be displayed. Below the normal range, an underscale signal causes the compliment of the digital signal to be displayed together with a minus sign.

18 Claims, 6 Drawing Figures

INVENTOR
FRANK C. ROCK
BY Flehr, Hohbach, Test, Albritton & Herbert
ATTORNEYS

INVENTOR
FRANK C. ROCK
BY Flehr, Hohbach, Test, Albritton & Herbert
ATTORNEYS

| Scale Region | | A | B | 48 | 103 | 104 | 105 | 106 | 107 | 108 | 109 | 110 | 51 | 52 |
|---|---|---|---|---|---|---|---|---|---|---|---|---|---|---|
| Over-Scale | 1.500-1.899 | 1 | 1 | 1 | 0 | 0 | 1 | 0 | 0 | 1 | 0 | 1 | 1 | 0 |
| | 1.100-1.499 | 0 | 1 | 1 | 0 | 0 | 1 | 0 | 0 | 1 | 0 | 1 | 1 | 0 |
| | 1.00-1.099 | 0 | 0 | 1 | 0 | 0 | 1 | 1 | 0 | 0 | 0 | 1 | 1 | 0 |
| On-Scale | 0.900-0.999 | 1 | 0 | 1 | 0 | 1 | 0 | 0 | 0 | 1 | 1 | 0 | 0 | 0 |
| | 0.500-0.899 | 1 | 1 | 1 | 0 | 0 | 1 | 0 | 0 | 1 | 1 | 0 | 0 | 0 |
| | 0.100-0.499 | 0 | 1 | * | * | 0 | * | 0 | 0 | 1 | 1 | 0 | 0 | 0 |
| | 0.000-0.099 | 0 | 0 | 0 | 1 | 0 | 0 | 0 | 0 | 1 | 1 | 0 | 0 | 0 |
| Under-Scale | (-)0.100-(-)0.001 | 1 | 0 | 0 | 0 | 0 | 1 | 0 | 1 | 0 | 0 | 1 | 0 | 1 |
| | (-)0.500-(-)0.101 | 1 | 1 | 0 | 0 | 0 | 1 | 0 | 1 | 0 | 0 | 1 | 0 | 1 |

* EITHER 0 OR 1

FIG-4

| Number | $A_3$ | $B_3$ | $C_3$ | $D_3$ |
|---|---|---|---|---|
| 0 | 0 | 0 | 1 | 0 |
| 1 | 0 | 1 | 1 | 0 |
| 2 | 0 | 1 | 1 | 1 |
| 3 | 0 | 1 | 0 | 1 |
| 4 | 0 | 1 | 0 | 0 |
| 5 | 1 | 1 | 0 | 0 |
| 6 | 1 | 1 | 0 | 1 |
| 7 | 1 | 1 | 1 | 1 |
| 8 | 1 | 1 | 1 | 0 |
| 9 | 1 | 0 | 1 | 0 |

FIG-4a

INVENTOR
FRANK C. ROCK
BY Flehr, Hohbach, Test, Albritton & Herbert
ATTORNEYS

INVENTOR
FRANK C. ROCK
BY Fehr, Hohbach, Test, Albritton & Herbert
ATTORNEYS

DIGITAL SCALE AND METHOD

BACKGROUND OF THE INVENTION

This invention pertains generally to weighing scales and more particularly to a system and method for providing a digital display of the reading of the scale.

Heretofore, some attempts have been made to provide scales with means for digitally displaying the weights of objects being weighed upon them. In scales of the type having an indicator or pointer attached to a rotatably mounted shaft, a common approach has been to connect a potentiometer or variable resistor to the shaft in such manner that the resistance of the potentiometer is dependent upon the rotational position of the shaft. Thus, when an electrical current of constant magnitude is passed through the potentiometer, the voltage developed across the potentiometer is likewise dependent upon the position of the shaft and the weight of the object being weighed. Such a system has certain disadvantages. For example, the potentiometer may impose a drag or load on the shaft which can adversely affect the accuracy of the scale. Also, potentiometers generally do not have the accuracy required for scales used in certain industrial and commercial applications. With digital displays for scales of the type having rotatably mounted pointers, a problem also exists when the pointer passes out of the normal operating range of the scale. With such scales, the pointer typically travels through 360° of rotation between the zero and full scale readings, with digital values associated with various pointer positions. The problem arises because for a given pointer position, the digital value is the same regardless of the number of revolutions made by the pointer in reaching that position. Thus, for example with a scale having a full scale of 100 pounds, the pointer occupies the same rotational position for a reading of 105 pounds as it does for a reading of 5 pounds. Likewise, if the pointer falls below zero, an erroneous reading such as 99 pounds will be given.

There is, therefore, a need for a new and improved digital scale and method which overcome the foregoing and other difficulties encountered with digital scales heretofore provided.

SUMMARY AND OBJECTS OF THE INVENTION

In the digital scale and method of the present invention, an encoder is operably connected to the shaft of the scale for producing a digital signal indicative of position of the shaft. This signal is converted to an excess—3 coded binary signal. The excess—3 coded signal is converted to a binary coded decimal signal which is displayed to provide a digital indication of the weight of an object being weighed. Means is provided for determining when the scale is outside its normal operating range, and when an underscale is detected, the excess—3 coded signal is complemented before being converted to a binary coded decimal. Means is also provided for displaying a minus sign in the output display when this underscale condition is detected. When an overscale condition is detected, an overscale digit is displayed. Means is also provided for scaling the binary coded decimal signal before it is displayed so that the output display will be in the desired increments of measure.

It is in general an object of the present invention to provide a new and improved digital scale system and method.

Another object of the invention is to provide a system and method of the above character which includes means for indicating when the scale is outside its normal range of operation.

Another object of the invention is to provide a system and method of the above character which includes means for scaling the output display to provide readings in the desired units.

Additional objects and features of the invention will be apparent from the following description in which the preferred embodiments are set forth in detail in conjunction with the accompanying drawing.

BRIEF DESCRIPTION OF THE DRAWING

FIG. 4 is a logic truth table for the overscale/underscale means shown in FIG. 3.

FIG. 4*a* is a table illustrating the cyclic excess-3 binary code used for the most significant decode.

DESCRIPTION OF PREFERRED EMBODIMENT

Figures 1, 2:
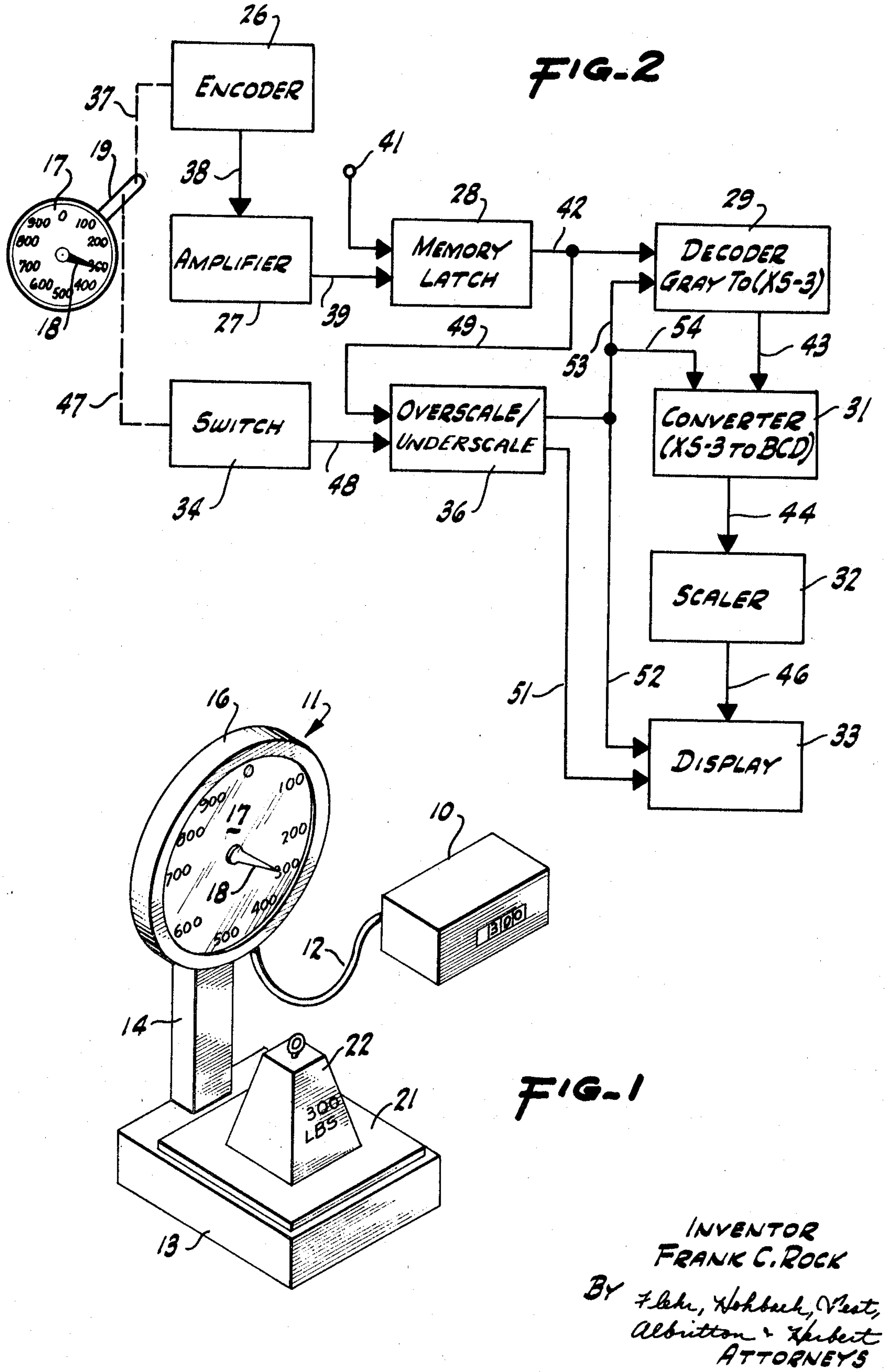
FIG. 1 illustrates one embodiment of a platform scale incorporating the present invention.
FIG. 2 is a block diagram of a digital display system incorporating the present invention.

FIG. 1 illustrates an embodiment of the invention in which the digital display system is housed in a separate cabinet and connected to a conventional platform scale 11 by means of a cable 12. The scale includes a base portion 13 which supports an upright housing 14 having a dial head 16 at its upper extremity. The dial head includes a dial or scale 17 and a pointer 18 which is secured to a rotatably mounted shaft 19. A weighing platform 21 is mounted on the base portion 13 and operably connected to the shaft 19 and pointer 18 in such manner that vertical deflection of the platform produces a corresponding rotational deflection of the shaft and pointer. The scale illustrated has a range of 0 to 1,000 pounds, and the pointer 18 and shaft 19 make one complete revolution of 360° over this range. To illustrate the operation of the scale the digital display system, a 300 pound weight is shown on the platform 21. The pointer 18 is shown rotated to a position such that it points toward the number 300, and the digital display unit shows a corresponding reading of 300 pounds.

The embodiment of the digital display system illustrated in FIG. 2 includes an encoder 26, amplifier 27, memory latch 28, decoder 29, converter 31, scaler means 32, digital display means 33, shaft position sensing switch 34, and overscale/underscale sensing means 36.

The encoder 26 is operably connected to the shaft 19 to which the pointer is secured and provides means for generating a digital signal indicative of the rotational position of the pointer and shaft. In the presently preferred embodiment, the encoder 26 is a conventional unit of the photoelectric type. This unit has a disc attached to a rotatably mounted shaft. The disc is formed to include a plurality of concentric bands each of which is divided into a plurality of transparent segments and opaque segments. A light source is provided on one side of the disc, and a plurality of photoelectric cells are provided on the other side and arranged in such manner that one cell is aligned with each band on the disc. The encoder produces a binary coded signal having a number of digits or bits corresponding to the number of bands and photocells. A transparent segment between the light source and a photocell produces a logic 1 output, and an opaque area in front of the photocell produces a logic 0 output. The encoder used in the presently preferred embodiment of the invention has 12 bands on its disc and produces 1,000 different 12-bit binary numbers, each corresponding to a different shaft position.

It is desirable that the output of the encoder be coded in such manner that only one bit changes in value between successive numbers. Thus, the errors and ambiguity which might result if two or more bits were to change between successive shaft positions is avoided. The output of the encoder used in the presently preferred embodiment is coded in a code commonly known as the cyclic Gray code.

The shaft of the encoder 26 is connected to be driven by the scale shaft 18 by means of a gear train indicated by the dashed line 37. By mounting the encoder and pointer on separate shafts, problems such as shaft alignment are avoided, and the use of gears permits adjustments to be made in the drive ratio between the shafts.

The Gray coded binary output of the encoder 26 is delivered to the input of the amplifier 27 through a circuit 38. This can be a conventional amplifier, and its output is connected to the data input of the memory latch 28 through a circuit 39.

The memory latch 28 is a conventional logic element having a clock input 41 in addition to its data input. As long as the clock input remains high, the signal at the data input is transferred to the output of the memory latch. When the clock input goes low, the signal present at the data input at the time of the transition is stored in the latch and delivered to the output until the clock input is permitted to go high again.

The output of the memory latch 28 is connected to the decoder 29 through a circuit 42. The decoder provides means for converting the Gray coded binary signal to an excess–3 binary coded decimal. The output of the decoder is passed to the converter 31 through a circuit 43 where the excess–3 coded signal is converted to a binary coded decimal signal.

The binary coded decimal signal from the converter 31 is passed to the scaler means 32 through a circuit 44. The scaler provides means for multiplying the binary coded decimal signal by a factor necessary to provide the desired increment of measure. For example, with an encoder having 1,000 incremental outputs, a full scale reading of 2,000 in 2 pound increments can be provided by multiplying the encoder output by 2. Similarly, a full scale reading of 500 in 0.5 pound increments is provided by dividing by 2. Such multiplication is performed by conventional logic elements in the scaler means.

The scaled binary coded decimal signal output of the scaler means 32 is coupled to the digital display means 33 through a circuit 46. In the presently preferred embodiment, the digital display means includes conventional digital display elements known as Nixie tubes and drivers therefor. If desired, other types of display elements, such as 7-line tubes, can be used with appropriate drivers.

Means is provided for determining whether the scale is in its normal range of operation. This means includes the switch 34 and overscale/underscale detecting means 36. In one presently preferred embodiment, the switch 34 is a reed switch which is actuated by a small magnet carried by the shaft 19, as indicated by the dashed line 47. This switch is adapted for switching between conducting and nonconducting conditions when the pointer is in a position corresponding to approximately 10 percent to 50 percent of the full scale reading. Below the 10 percent position the switch remains closed. It opens as the pointer approaches the 50 percent position and remains open for all pointer positions greater than 50 percent.

The switch 34 delivers a control signal to the overscale/underscale means 36 through a circuit 48. The overscale/underscale means also receives an input signal from the memory latch 28 through circuits 42 and 49. The overscale/underscale means includes logic elements for comparing these two input signals and producing an overscale signal in the circuit 51 when the pointer 18 has made more than one revolution in making a particular reading. The circuit 51 is connected to the digital display means 33, and the overscale signal causes an overscale digit to be displayed.

When the pointer 18 is below zero, an underscale signal is produced in the circuit 52. This circuit is connected to the digital display means for causing a minus sign to be displayed in response to the underscale signal. Means is also provided for displaying the complement of the digital signal in response to the underscale signal. Thus, the underscale signal is applied to the decoder 29 and converter 31 through circuits 53 and 54, respectively. As is discussed more fully hereinafter, the decoder and converter include means for complementing the digital signal when a underscale condition is detected. Thus, when the pointer 18 is below zero, instead of displaying a number such as "999" the display means indicates its negative complement "–1."

The digital display system of the present invention is conveniently constructed by mounting the encoder 26, switch 34, and amplifier 47 inside the scale 11. All of the remaining components except the scaler means 32 and digital display means 33 are conveniently assembled on a single printed circuit board. The components can be the same regardless of the scale factor to be used in a particular unit. The scaler means 32 and display means 33 are conveniently assembled on a second circuit board, with the arrangement of this board being dependent upon the particular scale factor or increment of weight desired. The two boards are conveniently assembled in a separate housing such as the unit 10 illustrated in FIG. 1.

Figure 3:
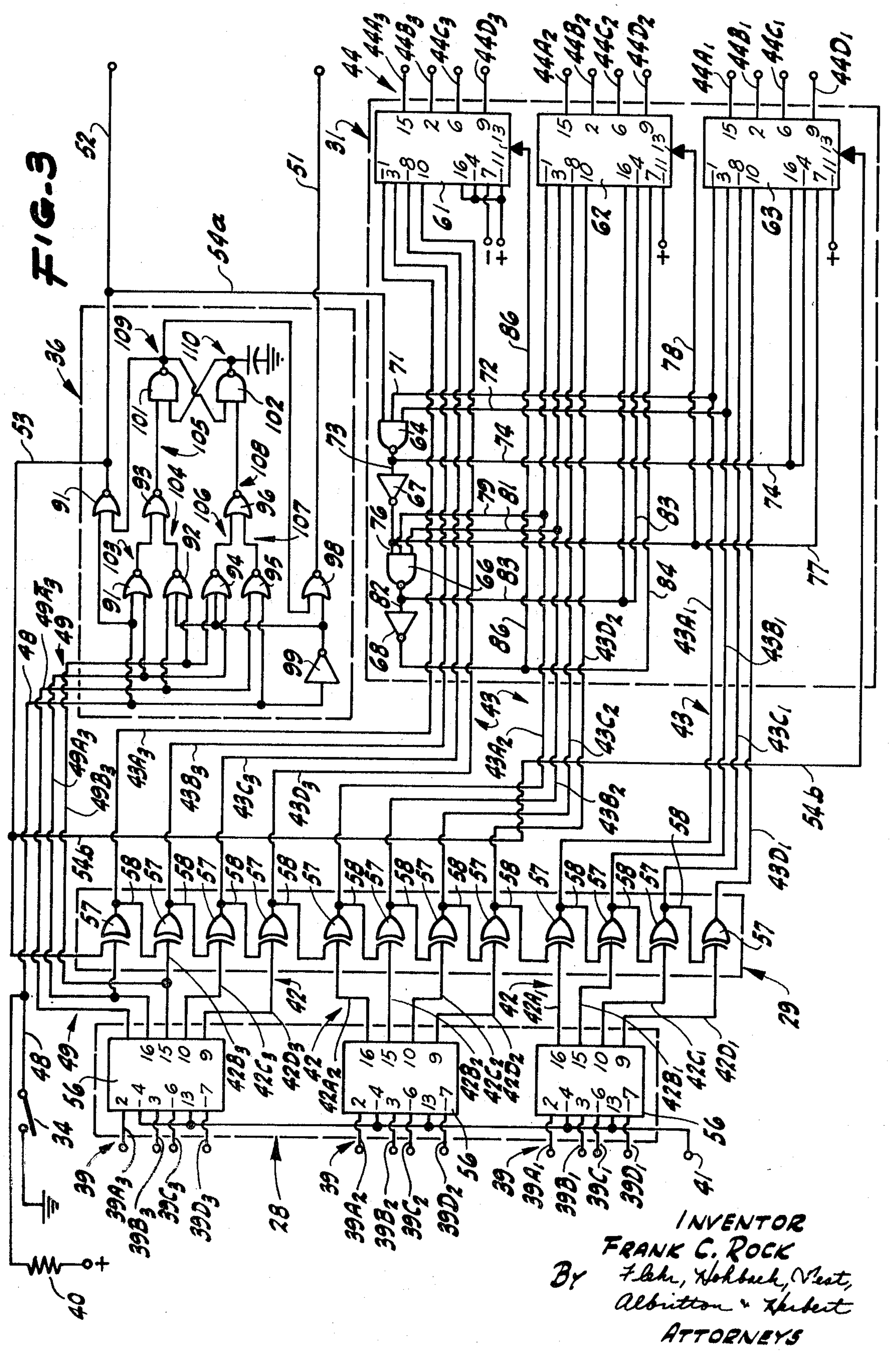
FIG. 3 is a schematic diagram of a portion of the system illustrated in FIG. 2, including memory latch, decoder means, converter means, and overscale/underscale means.

FIG. 3 is a wiring diagram of all the components which are mounted on the first circuit board in one presently preferred embodiment of the invention. Thus, this diagram illustrates the memory latch 28, decoder 29, converter 31, and overscale/underscale means 36.

The memory latch 20 comprises a plurality of conventional memory latch elements 56, such as model SN 7475 quadruple latches manufactured by Texas Instruments. Each of these quadruple latches has four data inputs, a clock input and a pair of complementary outputs for each data input. The data inputs are connected for receiving the cyclic Gray coded signal from the encoder 26 through the circuit 39. This circuit comprises 12 conductors or leads $39A_1$ – $39D_3$, each of which is connected to one of the data inputs and carries one bit of the Gray coded signal. For convenience the following convention will be used throughout the disclosure to identify the leads which carry the binary coded signal between the various elements. Each such reference numeral has a numerical prefix, a letter, and a subscript. The numerical prefix corresponds to the reference numeral of the circuit of which the lead is a part. The letter indicates the significance of the bit carried by the lead within each decade, with earlier letters indicating bits of greater significance, and the subscript designates the digit or the decade, with higher numbered subscripts corresponding to greater significance. Thus, in the circuit 39 the lead $39A_3$ carries the bit of greatest significance, and the lead $39D_1$ carries the bit of least significance.

The clock inputs of all of the elements in the memory latch 28 are connected together to a common clock input terminal 41. As long as the input to the terminal 41 remains high, i.e., logic 1, the signal at each data input is transferred to the corresponding pair of complementary outputs. If a logic 0 signal is applied to the clock input terminal 41, the signals present at the data inputs at the time of transition are stored in the latch element and delivered to the outputs until the clock input is permitted to go high again.

The non-complemented outputs of the memory latch elements are connected to the inputs of the decoder means 29 through leads $42A_1$ – $42D_3$ in the circuit 42. The non-complemented outputs carrying the 2 most significant bits are also connected to the overscale/underscale means 36 by leads $49A_3$ and $49B_3$ of the circuit 49. The complemented output of the most significant bit is connected to the overscale/underscale means by a lead $49\bar{A}_3$.

The decoder means 29 includes a plurality of conventional exclusive-OR elements 57 such as model SN 7486 quadruple 2-input elements manufactured by Texas Instruments. Three of the TI units are used to provide a total of 12 exclusive-OR elements, each having 2 inputs and 1 output. The output of each exclusive-OR element 57 is connected to one of the inputs of the element 57 for the bit of next lesser significance by a lead 58. The circuit 53 which carries the underscale signal is connected to one of the inputs of the exclusive OR gate of greatest significance. The outputs of the exclusive OR elements are connected to the converter means 31 by leads $43A_1$ – $43D_3$ in the circuit 43.

The converter means 31 includes three four-bit adders 61–63, NAND gates 64, 66 and inverters 67, 68. The four-bit adders are units of conventional design such as Texas Instruments model SN 7483. The NAND gates and inverters are likewise conventional. Each of the four-bit adders has two four-bit inputs, a carry input, and a four-bit output. The output is equal to the sum of the numbers applied to the input plus the carry input. The leads of the circuit 43 are connected to the first four-bit input of each of the adders, as illustrated in FIG. 3. The second four-bit input of the adder 61 is connected to sources of positive and negative electrical energy so that a binary number 1101 is always applied to the input. The second four-bit inputs of the adders 61 and 63 are connected for receiving either 1101 or 0011 binary signals in a manner described hereinafter.

The NAND gates 64 and 66 each have 3 inputs and 1 output. One input of the NAND gate 64 is connected to the circuit 54a which carries the underscale signal. The two remaining inputs of NAND gate are connected to the most significant bits of the first four-bit input of the adder 63 by leads 71 and 72.

The output of the NAND gate 64 is connected to the input of the inverter 67 through a circuit 73. This output is also connected to the digits of greatest and next to greatest significance in the adder 63 by a circuit 74.

The output of the inverter 67 is connected to one of the inputs of the NAND gate 66 through a circuit 76. This same output is connected to the digit of next to least significance in the adder 63 by a circuit 77. It is also connected to the carry input of the adder 62 by a circuit 78. The remaining inputs of the NAND gate 66 are connected to the digits of greatest significance in the adder 62 by circuits 79 and 81.

The output of the NAND gate 66 is connected to the input of the inverter 68 through a circuit 82. It is also connected to the digits of greatest and next to greatest significance in the second four-bit input of the adder 62 by a circuit 83.

The output of the inverter 68 is connected to the digit of next to least significance in the second four-bit input of the adder 62 by a circuit 84. This output is also connected to the carry input of the adder 61 by a circuit 86.

The outputs of the four-bit adders are connected to the scaler means 32 by leads 44$A_1$ – 44$D_3$ of the circuit 44. The scaler and display means will be described hereinafter.

The overscale/underscale means 36 includes a plurality of NOR gates 91–98, an inverter 99, and a pair of NAND gates 101, 102. The overscale/underscale means receives a first input through the circuit 48 from the shaft position indicating switch 34. When the switch 34 is closed, the circuit 48 is connected to ground to provide a low or logic 0 signal. When the switch is open, the circuit 48 is connected to a source of positive voltage to provide a high or logic 1 signal. The overscale/underscale means also is connected for receiving input signals from the most significant bits of the memory latch by means of the circuit 49. The manner in which the element of the overscale/underscale means are interconnected is shown in detail in FIG. 3.

FIG. 4 provides a truth table for the overscale/underscale means 36 illustrated in FIG. 3. In this table, $A_3$ and $B_3$ represent the most and next to most significant output bits from the memory latch, respectively, and the number 48 represents the signal in the circuit 48 from the shaft position switch 34. The numerals 103-108 designate the outputs of the NOR gates 91–96, respectively, and the numbers 109 and 110 represent the outputs of the NAND gates 101 and 102, respectively. The output of the NOR gate 97 is the underscale signal, and it is designated by the number 52 of the circuit in which it appears. The output of the NOR gate 98 is the overscale signal, and it is likewise designated by the number of its circuit 51.

From the truth table of FIG. 4 and the cyclic code table of FIG. 4a, it can be seen that the underscale signal has a value of logic 1 only when the switch 34 is closed, indicating that the pointer is below the 10 percent position, and the most significant bits from the encoder have a value 1, 0, or 11, indicating that the pointer is in the third or fourth quadrant of its rotation. Likewise, it can be seen from the table that an overscale signal is produced only when the switch 34 is open, indicating that the pointer is above the 50 percent position, and the most significant bits are logic 0's, indicating that the pointer is in the first quadrant of its rotation. Once triggered, the overscale signal remains activated as long as the pointer is between 1.0 and 1.899 times the full scale reading. Circuit 51 is returned to a logic 0 level when the most significant bits become 10 as the pointer returns to a normal scale region.

Operation and use of the system illustrated in FIGS. 3 and 4 can now be described briefly. Initially, let it be assumed that the scale is operating within its normal range of operation so that the overscale and underscale signals are both logic 0's. In this situation, the output of the encoder 26 provides a direct digital indication of the reading of the scale. This Gray coded number is converted to excess 3 form in the decoder means 29 and applied to the first four-bit inputs of the adders 61-63 in the converter means 31. Since the underscale signal input to the NAND gate 64 through the circuit 64a is a logic 0, the binary coded number 1101 is applied to the second four-bit input of each of the adders 61–63. This binary number 1101 is the binary 2's or the 10's complement of the decimal number 3. As is well known to those familiar with the art, the addition of the complement of a number is equivalent to subtraction of that number. Thus, by adding the 10's complement of 3 to the excess–3 coded binary numbers in the four-bit adders, the excess–3 coded numbers are converted to binary coded decimals and appear as such in the circuit 44.

Now let it be assumed that the scale is operating in an overscale condition, that is, the pointer has made more than one complete revolution of 360°. In this situation, an overscale signal is produced in the circuit 51 by the overscale/underscale means 36, and this signal is applied to the scaler and digital display means and causes an overscale digit to be displayed. The encoder, decoder, and converter function in the same manner as they do when the scale is operating within its normal range.

Finally, let it be assumed that the scale pointer is below zero so the scale is operating in an underscale condition. In this situation, an underscale signal having a value of logic 1 is applied through the circuit 53 to the most significant exclusive-OR element in the decoder 29. This causes a change in the state of each of the outputs of the decoder, thereby forming the 9's or binary 1's complement of the excess–3 signal output from the decoder. Assuming that the excess–3 coded signal does not contain a nine, i.e., 1100, in either of its least significant digits, the signal is converted to a binary coded decimal in much the same manner that the excess–3 signal is converted when the scale is operating in its normal range. Thus, 3 is subtracted by adding 1101 to each of the 3 digits in the four-bit adders. It will be noted that when the pointer is below zero, the correct display or scale reading is the 10's complement of the encoder output, rather than the 9's complement. This is conveniently done by applying the underscale signal to the carry input of the least significant four-bit adder through the circuit 54*b*. Thus the signal produced in the circuit 44 is the 10's complement of the output of the encoder. The underscale signal is also applied to the display means through the circuit 52 to cause a minus sign to be displayed with the 10's complement.

When the pointer is below zero and one of the digits in excess–3 form is a 9, i.e., 1100, a somewhat different method is required for converting from excess–3 to binary coded decimal form. In this situation, if 3 were subtracted and 1 added, the result would be 10, i.e., 1010, which is an invalid value for a single digit. The presence of a 9 in the inputs of adders 61 and 62 is detected by the NAND gates 66 and 64, respectively. When 9 is sensed in the underscale situation, the NAND gates and inverters 67, 68 apply a binary 0011, i.e., to the second four-bit input of the adder in the decade in which the 9 is sensed. A binary 1, i.e., 0001, is also applied to the carry input of the next higher decade. Thus, 0011 is added to the signal excess 3 coded signal 1100 to give 1111, and the carry to the underscale signal in the circuit 54*b* is added to this to give 0000, rather than the invalid 1010, in the output of the decade in which the 9 appears.

Figure 5:
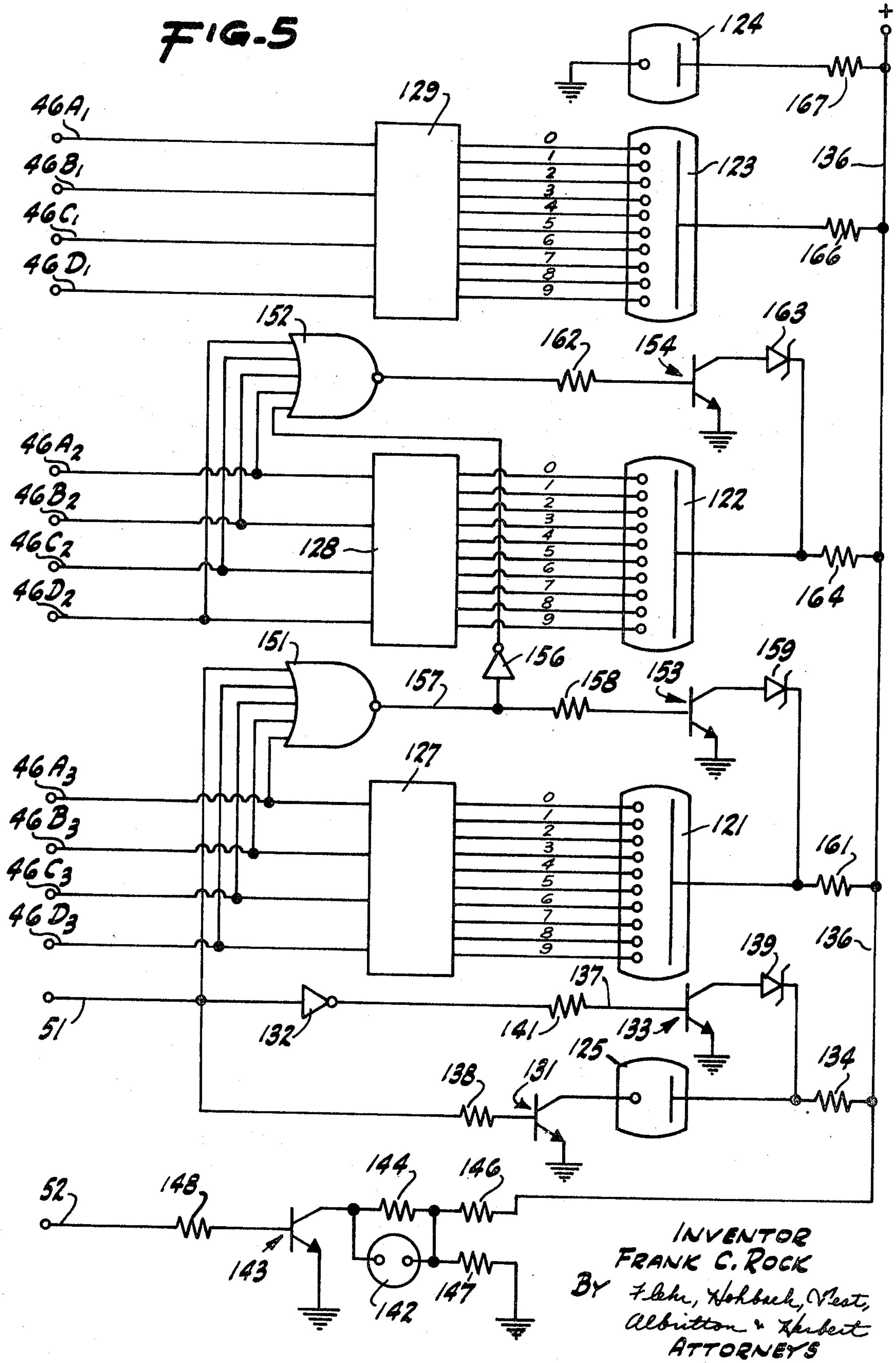
FIG. 5 is a schematic diagram of the digital display means of the system illustrated in FIG. 2.

FIG. 5 illustrates one presently preferred embodiment of digital display means 33 for use in the system of the present invention. This means includes a plurality of conventional Nixie tubes 121–125 and Nixie tube drivers 127–129 connected for driving the Nixie tubes 121–123, respectively. The Nixie drivers 127–129 are connected for receiving the output signal from the scaler means 32 through leads $46A_1-46D_3$.

Means is provided for displaying an overscale digit in response to an overscale signal in the circuit 51. This means includes the Nixie tube 125, a transistor 131, an inverter 132, and another transistor 133. One electrode of the Nixie tube 125 is connected to a source of positive voltage through a resistor 134 circuit 136. The electrode of the Nixie tube corresponding to the over-digit to be displayed is connected to the collector of the transistor 131 through a circuit 137. The emitter of the transistor 131 is grounded, and the base is connected to the circuit 51 through a resistor 138. The collector of the second transistor 133 is connected to the junction of the resistor 134 and first electrode of the Nixie tube through a zener diode 139. The emitter of this transistor is also grounded, and its base is connected to the circuit 51 through the inverter 132 and a resistor 141.

Means is provided for displaying a minus sign (—) in response to an underscale signal in the circuit 52. This means includes a neon lamp 142 and a transistor 143. The collector of the transistor 143 is connected to the source of positive voltage through resistors 144 and 146 and through the circuit 136. The neon lamp 142 is connected in parallel with the resistor 144, and a resistor 147 is connected to ground from the junction of the neon lamp and resistors 144 and 146. The emitter of the transistor 143 is grounded, and the base is connected to the circuit 52 through a resistor 148.

Means is provided for blanking the Nixie tubes to prevent the display of zeros in digits of greater significance than the most significant digit in which a non-zero digit is displayed. This means includes NOR gates 151 and 152, transistors 153 and 154, and an inverter 156. The NOR gate 151 has five inputs, connected to the leads $46A_3-46D_3$ and to the circuit 51. The output of the NOR gate 151 is connected to the base of the transistor 153 through a circuit 157 and resistor 158. The emitter of the transistor 153 is grounded, and the collector is connected to one electrode of the Nixie tube 121 through a zener diode 159. The junction of the diode and electrode are connected to the source of positive voltage through a resistor 161 and the circuit 136.

The NOR gate 152 also has five inputs, four of which are connected to the leads $46A_2-46D_2$, the fifth being connected to the output of the NOR gate 151 through the circuit 157 and inverter 156. The output of the NOR gate 152 is connected to the base of the transistor 154 through a resistor 162. The emitter of this transistor is also grounded, and the collector is connected to one electrode of the Nixie tube 122 through a diode 163. The junction of the diode and electrode is connected to the source of positive voltage through a resistor 164 and the circuit 136.

The Nixie tube 123 is connected to the source of positive voltage through a resistor 166 and the circuit 136. In the embodiment illustrated, the Nixie tube 124 is connected for continuously displaying "0." Thus, one electrode of this tube is connected to the source of positive voltage through a resistor 167, and the electrode corresponding to the zero display is grounded.

Operation and use of the digital display means illustrated in FIG. 5 can now be described. Let it be assumed that a binary coded decimal signal of the desired units of measure is present in the circuit 46. This signal is applied to the Nixie tube drivers 127–129 which cause the appropriate digits to be displayed by the Nixie tubes 121–123. When the scale is operating in its normal range, the signal in the circuit 51 is a logic 0, the transistor 131 is turned off, transistor 133 is conducting, and Nixie tube 125 is turned off. When the scale is operating above its normal range, a logic 1 appears in the circuit 51, and this turns on the transistor 131 and turns off the transistor 133. In this condition, current flows through the resistor 134, the Nixie tube 135, and the transistor 131 displays the overscale digit 1.

When an underscale condition occurs, a logic 1 signal appears in the circuit 52, turning on the transistor 143. In this condition, current flows through the resistors 146 and 144, and the voltage drop across the resistor 144 fires the neon lamp 142, displaying the minus sign. When the scale is not in its underscale condition, the signal in the circuit 52 has a value of logic 0 and the transistor 143 is turned off. In this situation, no current passes through the resistor 144 or the neon lamp 142, and the lamp remains extinguished.

As long as either the overrange digit is displayed or a non-zero digit is displayed in the Nixie tube 121, at least one of the inputs to the NOR gate 151 is a logic 1. The output of the gate 151 is 0, the transistor 153 is turned off, and the Nixie tube 121 operates in the normal manner. When, however, all of the inputs to the NOR gate 151 are 0's, indicating a zero digit display for the Nixie tube 121 and the absence of an overscale signal, the output of the NOR gate 151 is a logic 1. The transistor 153 is turned on, grounding the electrode of the Nixie tube 121 through the zener diode 159, thereby blanking the tube. The logic 1 signal at the output of the NOR gate 151 produces a logic zero signal at the output of the inverter 156 which is applied to one of the inputs of the NOR gate 152. If, at this time, a zero is also present in the Nixie tube 122, the transistor 154 is turned on, blanking that tube also.

The scaler means 32 can be chosen from a number of well known circuits for multiplying the binary coded decimal output of the converter 31 by a predetermined factor to provide the desired increment of measure. Certain algorithms, have, however, been found to be particularly useful in the present invention. For example, multiplication by 5 is readily accomplished by dividing by 2 and shifting one decade downward. Likewise, multiplication by 3 is readily performed by adding each digit to itself three times and applying suitable correction factors.

Thus far, the method of the present invention has been discussed only in connection with one presently preferred embodiment of the apparatus for practicing it. This method can be summarized as comprising the steps of Gray coded binary signal indicative of the position of the scale pointer, converting this Gray coded signal to an excess–3 coded binary signal, complementing the binary signal when the scale is operating below its normal range, converting the excess–3 coded signal to a binary coded decimal, scaling the binary decimal signal by a predetermined factor to provide the desired increment of measure, and visually displaying the scaled signal in decimal form. In addition, a minus sign is displayed when the scale is below its normal range of operation, and an overscale digit is displayed when it is above that range.

It is apparent from the foregoing that a new and improved digital display system and method have been provided. While only the presently preferred embodiment has been described, as will be apparent to those familiar with the art, certain changes and modifications can be made without departing from the scope of the invention as defined by the following claims.

I claim:

1. In a digital display system for a scale of the type in which the weight of an object being weighed is indicated by the position of a movable member, said scale having a normal range of operation in which said member moves between predetermined limiting positions corresponding to zero and full-scale weight readings, encoder means operably connected to the movable member for generating a digital signal indicative of the position of said member, means for converting the digital signal from said encoder means to a binary coded decimal signal, scaler means for receiving said binary coded decimal signal and scaling it by a predetermined factor, digital display means connected to said scaler means for displaying the scaled signal to provide a digital indication of the weight of the object being weighed, and overscale/underscale means connected to said movable member for detecting when the scale is outside its normal range of operation and conditioning said display means to display the complement of the scaled signal as a negative quantity when said member is in a position corresponding to a weight less than zero.

2. A system as in claim 1 together with selectively operable memory latch means connected for receiving and selectively storing the digital signal from said encoder means.

3. A system as in claim 1 wherein said overscale/underscale means is connected to said display means for conditioning the same to display an overscale digit when said movable member is in a position corresponding to a weight greater than the full-scale reading.

4. In a digital display system for a scale of the type in which the weight of an object being weighed is indicated by the rotational position of a rotatably mounted member, said scale having a normal operating range of zero to full-scale weight readings corresponding to one revolution of said member, encoder means operably connected to the rotatably mounted member for producing a digital signal indicative of the rotational position of said member, converter means for converting said digital signal to a binary coded decimal signal, digital display means for displaying said binary coded decimal signal to provide a visual digital indication of the weight of the object being weighed, and overscale/underscale means connected for sensing the position of said rotatably mounted member and conditioning said display means to display the complement of said binary coded decimal signal as a negative quantity when said member is in a position corresponding to a weight less than zero.

5. A system as in claim 4 together with scaler means connected intermediate said converter means and said digital display means for scaling said binary coded decimal signal by a predetermined factor.

6. A system as in claim 4 together with memory latch means connected for receiving and storing the digital signal from said encoder means.

7. A system as in claim 4 wherein said overscale/underscale means includes means connected to said rotatably mounted member for producing a control signal when said member is in certain predetermined positions toward the ends of the revolution corresponding to the normal operating range of the scale.

8. A system as in claim 4 wherein said digital display means includes means for displaying a minus sign when said overscale/underscale means senses that said rotatably mounted member is in a position corresponding to a weight less than zero.

9. A system as in claim 4 wherein said overscale/underscale means is connected to said digital display means for conditioning the same to display an overscale digit when said rotatably mounted member is in a position corresponding to a weight greater than the full-scale reading.

10. A system as in claim 4 wherein said digital display means includes a multidigit display comprising a plurality of digital display elements and means for blanking said display elements to prevent the display of zeros in digits of greater significance than the most significant digit in which a non-zero digit is displayed.

11. In a digital display system for a scale of the type in which the weight of an object being weighed is indicated by the rotational position of a rotatably mounted member, said scale having a normal operating range of zero to full-scale readings corresponding to one complete revolution of said member, encoder means operably connected to the rotatably mounted member for producing a binary coded signal indicative of the position of said member, decoder means connected for converting said binary coded signal into an excess—3 coded binary signal, converter means for converting said excess—3 coded binary signal into a binary coded decimal signal, digital display means for displaying said binary coded decimal signal to provide a visual digital indication of the weight of the object being weighed, and overscale/underscale means for sensing the position of said rotatably mounted member and conditioning said decoder, converter and display means in such manner that said display means displays the complement of said binary coded decimal signal as a negative quantity when said member is in a position corresponding to a weight less than zero.

12. A system as in claim 11 together with scaler means connected intermediate said converter means and said digital display means for scaling said binary coded decimal signal by a predetermined factor.

13. A system as in claim 11 wherein said overscale/underscale means is connected wherein said overscale/underscale means is connected to said digital display means for conditioning the same to display an overscale digit when said rotatably mounted member is in a position corresponding to a weight greater than the full-scale reading.

14. In a method for digitally displaying the weight of an object on a scale of the type in which the weight of the object is indicated by the position of a rotatable member, said scale having a normal operating range of zero to full-scale readings corresponding to one revolution of said member, the steps of generating by means of an encoder operably connected to the rotatable member a digital signal indicative of the position of said member, converting the digital signal to a binary coded decimal signal, visually displaying said binary coded decimal signal in digital form, sensing the position of the rotatably mounted member to determine whether the scale is outside its normal operating range, and displaying the complement of said binary coded decimal as a negative quantity when said member is in a position corresponding to a reading less than zero.

15. A method as in claim 14 together with the additional step of displaying an overscale digit in the digital display when the rotatably mounted member is in a position corresponding to a weight greater than the full-scale reading.

16. A method as in claim 14 wherein said digital signal is converted to excess—3 coded binary form before it is converted to a binary coded decimal signal and wherein the excess—3 coded binary form of signal is complemented when scale is below its normal range.

17. A method as in claim 14 together with the additional step of scaling said binary coded decimal signal by a predetermined factor before said signal is displayed.

18. A method as in claim 14 together with the additional step of storing the digital signal from said encoder.

* * * * *